Aug. 25, 1959     F. ADAM     2,901,207

RELIEVABLE HANGERS, AND THE LIKE

Filed April 21, 1958

Inventor:
Folger Adam,

United States Patent Office 2,901,207
Patented Aug. 25, 1959

2,901,207

RELIEVABLE HANGERS AND THE LIKE

Folger Adam, Joliet, Ill.

Application April 21, 1958, Serial No. 729,874

7 Claims. (Cl. 248—293)

This invention relates to improvements in relievable hangers, and the like. By this term I contemplate hangers for clothing and like objects, which hangers are generally supported on the wall, and are of such construction that they will carry or sustain a predetermined load of such objects, but will yield and refuse to sustain greater loads than such predetermined amount. Such yielding is produced due to the excess load placed on the hangers, and results in allowing the carrying hook or arm to turn down towards a vertical position, thus assuming a position in which the objects will slide off from such hook or arm and be dropped to the floor. To ensure that such dropping or sliding action will occur the hook or arm is also of such design that, having turned down towards the vertical position, due to the excess load, such hook or arm will, in such position, not present any portion which can or will then sustain the objects.

In other words, the relievable hanger, to properly perform its intended function must conform to two primary conditions; it must be so designed and supported that it can and will yield under the force of the excess load, and, having so yielded it must then also allow the objects to fall clear so that such objects, none of them will be sustained but will all drop clear of the hook or arm. My presently disclosed unit is so designed and constructed that both of the foregoing objectives are completely fulfilled.

Units embodying the foregoing features and capable of meeting the foregoing objectives are usefully applied in many locations. A location in which such units will find wide usefulness and meet a need of importance is found in jail cells, and other enclosures for safe confinement of prisoners and other persons. It frequently occurs that persons so confined attempt to commit suicide by hanging themselves by the use of any tensile object at hand, as for example a torn up bed-sheet or other object. It then becomes necessary to find a suitable object to which such tension element may be attached, and a clothes hook or the like, if present, is frequently found to be suitable, if capable of sustaining the weight of the prisoner, for attachment of the tension element. It is a prime object of the present invention to provide a design and construction of such hook such that the weight of a prisoner, generally well over 100 pounds, will be sufficient to cause the sustaining hook to yield downwardly far enough to allow the tension element, such as the torn up bed-spread, to slide off from the hook, thus causing the attempted suicide operation to fail. In this connection it is also an important ingredient of my present invention to so form such yieldable or releasable hook that during the sliding of the tension element down along the so yielded hook such hook will not present any projection or part against or onto which the sliding tension element might catch, as such a catching would defeat the very purpose of the yield or release.

Broadly stated my invention comprises the provision of a bracket element of convenient form for attachment to the wall or other structural element, together with an arm or the like, also, herein called the hook for convenience, which arm is pivoted to the bracket for rock about a horizontal axis, thus enabling the arm to slant down at an angle sufficient to allow the tension element to slide off from the arm, and defeat the attemped suicide. I then provide yieldable means to normally exert a sufficient restraining force to hold such arm in its horizontal or substantially horizontal position against a load much smaller than that produced by the weight of a human being, so that the device may perform its normally intended function but will not carry the much greater weight imposed thereon by an attempted suicide. In this connection the load which should be normally provided for does not generally exceed twenty pounds, whereas the weight of a person who might make the suicide attempt would probably never be less than one hundred pounds and generally much more. Thus it is possible to provide for yield at a point of about twenty pounds applied at the outer end of the arm, being sufficient to sustain any normal or intended load, and with assurance that yield would occur by the imposition of the weight of any person attempting suicide.

The restraining force which normally holds the arm in its working position must be produced by an element of such form and nature that its adjustment cannot be changed by the confined person. An important feature of my present invention concerns itself with the provision of a restraining arrangement which may be readily adjusted or pre-set by the factory or by the warden, to such holding power as is desired, whereupon such device may be "set" at such adjusted position, with assurance that it cannot be tampered with to change its adjustment. Such tampering might be by way of insertion of some form of wedge or foreign object into the unit at a location such as would interfere with full yield to the load releasing position, or such as would substantially increase the load sustaining ability of the arm to a point sufficient to enable the suicide attempt to succeed. I have herein disclosed a form of structure such that no such jamming or interfering with the full releasing movement can be produced.

In connection with the foregoing, I have also provided a form and arrangement of construction such that the arm or hook is normally restrained against yield by a friction arrangement which is adjustable as to the amount of friction, and may then be locked at such adjusted position. In this connection it is noted that the friction is produced between companion faces or surfaces which are held together under an adjustable amount of force. The amount of such pressing force is then adjusted by the proper person, and the device is locked in such adjusted position. It is necessary to use materials for mutual engagement or frictional contact which will produce a dependable and substantially unchanging amount of friction between them, so that, with the passage of time after the adjustment has been made, the sustaining force will still remain at that value which is intended and to which the unit had been adjusted. In this connection it is also noted that some materials used for frictional engagement together possess the quality that after a substantial time lapse, or under substantial change of temperature, a sticking action occurs between them, so that, even though no change of the adjustment has been made, still the force needed to start yielding movement will have assumed a value much higher than that originally intended and for which the pre-setting had been made. Under such conditions it might well happen that the unit could now carry a sufficiently great load to enable the successful carrying through of the suicide.

An important feature of my present invention resides in the provision of a design and construction of the friction element and frictional surfaces by which the arm is sustained against normal loads, and also resides in the choice of such materials for these friction surfaces that permanence of frictional value will be assured, and so that such sticking action will be avoided, and so that usual temperature changes will not result in material change of the holding power of the arm from that value to which it had been purposely set. In this connection I have found that friction disks of such materials as hard red fiber, pressed between the smooth faces of steel elements, are satisfactory for the intended purpose. I have also found that a desirable form of the friction producing structure is one in which such friction disks are located between adjacent surfaces of the hub portion of the hook or arm, and of bracket elements, such as flanges, also of steel and having smooth surfaces, with provision for slightly flexing the bracket flanges against the proximate faces of the disks, such slight flexing being increased until the desired holding power is produced by such slight flexure. Then the parts may be locked in such adjusted position, and proper operations may then be produced to assure against further change of the adjustment without substantial destruction of the device. The friction faces of such hard red fiber should preferably be polished prior to setting the disks in place.

Another object of the present invention is to produce a design and construction of the hanger which can be readily produced from sheet metal die cut and formed into the bracket element, and with few additional elements which are such that they can be readily produced at low cost and by conventional shop operations.

Another purpose and object of the invention is to provide a hanger unit which will meet and comply with the safety requirements and regulations of authorities having charge of the design and installation of various units intended for use in penal institutions, juvenile homes, insane hospitals, jails, reformatories, and such institutions as those for retarded and feeble minded persons. The herein described unit is believed to fully meet and comply with any such requirements and specifications.

Other objects and uses of the invention will appear from a detailed description of the invention, which consists in the features of construction and combinations of parts hereinafter described and claimed.

Figure 3:
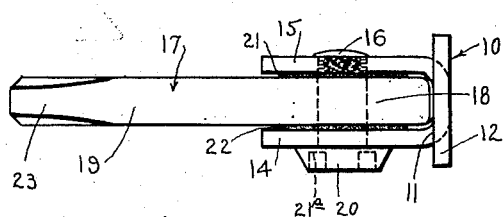
Figure 3 shows a top plan view corresponding to Figures 1 and 2.

In the embodiment shown in the drawing, the bracket element 10 is formed, conveniently, from sheet metal such as mild steel, to provide the face plate 11 of dimension elongated vertically, and having the enlarged end portions 12 and 13 which are perforated to receive attaching bolts, lag screws, expansion bolts or other elements for attachment to the wall. The central portion of such face plate is conveniently formed narrower than such end portions, as well shown in Figure 2.

Said central portion of the face plate has its side portions formed at right angles to provide the two companion bracket elements 14 and 15. These are parallel to each other, and separated slightly more than the thickness of the arm or hook element to be set between them. Conveniently these elements 14 and 15 are also of generally triangular form to provide, near their apices the openings through which is passed a securing and journalling pin 16. The opposing faces of these bracket elements surrounding the holes through which such pin is extended are nicely surfaced to produce smooth surfaces against which the friction disks, presently to be described, seat.

The arm or hook element 17 includes the hub portion 18, and the elongated arm 19 which normally extends substantially horizontally outwards from the wall or other structural element. This element 17 may be a casting or forging, having the side faces of its hub portion finished to provide smooth parallel faces companion to the inside faces of the bracket elements 14 and 15. It is desirable that all of the faces, including the opposite faces of the bracket elements 14 and 15, and the opposite side faces of the hub portion of the arm element 17 be parallel to ensure good holding and operating qualities of the assembled structure.

The locking and journalling pin 16 is provided with the head 20 which seats nicely against the outside face of the proximate bracket element 14, and extends through both such bracket element and the hub portion of the arm element 17. Such pin then extends through the opposite bracket element 15 but is threaded therein so that by turning such pin sufficiently the two bracket elements 14 and 15 may be slightly flexed towards each other. The amount of such flexing may be small, probably of the order of a few thousandths of an inch. The spacing between the opposing faces of the bracket elements is somewhat greater than the thickness of the hub portion of the arm, so that thin friction washers or disks 21 and 22 may be seated between the faces of the bracket elements 14 and 15 and the proximate faces of the hub. These disks may be rather thin, or they may be slightly seated back into shallow recesses provided in the inner faces of the bracket elements, so that in any case the surfaces of the arm need be separated from the faces of the bracket elements by only a slight separation, so thin in fact that it would be substantially impossible for the confined person to insert a wedge into such space and thus to interfere with the down rock of the arm under imposition of the load in excess of that which it is intended shall be carried.

The pin 16 should be locked against unintended rotation, once the desired flexing of the bracket elements 14 and 15 towards each other has been produced to produce the desired frictional engagement of the disks with the hub portion of the arm. To this end I prefer to peen or rivet the end of such pin after the adjustment has been effected, as shown by the slightly enlarged left-hand end of such pin in Figures 2 and 3. This will not only prevent change of the frictional holding quality exerted on the arm, but will also ensure that such pin remains stationary against rotation during any rock of the arm itself, the pin serving as a journal on which the arm must then rock. To this end the central portion of the pin is round and nicely polished.

The holding force exerted on the hub portion of the arm is due to the friction developed against the opposite faces of such hub portion. This holding force is then transmitted through the friction disks themselves to the proximate surfaces of the bracket elements 14 and 15 against which the disks are pressed by the adjusted tension of the pin 16. Thus each of the disks is subjected to a torque which tends to produce an angular strain in such disk. As the load imposed on the arm 17 is increased to thus increase the torque developed in such arm's hub portion, the disks are subjected to correspondingly greater torque forces until finally one or the other disk yields its frictional engagement with either the hub portion of the arm or with the inside face of the proximate bracket element 14 or 15, whereupon the holding power of that disk reduces greatly and the full torque developed by the arm is imposed on the other disk. Thereupon such other disk will also promptly yield and the restraining force tending to hold the arm against rock will fall to a low value and such arm will fall far enough to discharge the materials which are being carried by it. These operations will generally occur in very quick succession, once the imposed force has been raised above that for which the adjustment of the pin 16 was originally made.

Figure 4:
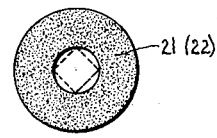
Figure 4 shows a face view of one of the friction disks or washers which are pressed against the side faces of the hub portion of the arm.

Now the yielding sequence above defined depends, for its start, on whether the inner or the outer face of one of the disks first yields from its holding power against the proximate surface, either the surface of the hub portion of the arm or the surface of the proximate bracket arm. This is on the assumption that the only restraining force exerted on such disk is that of frictional engagement of its face against a proximate surface. In some cases it may be found desirable to leave both disks free to slip with respect to both elements (the hub portion and the proximate bracket element, 14 or 15, as the case may be). In other cases it may be found desirable to control each disk, to ensure that such disk will never itself rock, so that the only slip which can then occur must be between the hub portion of the arm and the proximate face of a disk. Such assurance can be obtained by providing the pin 16 with a squared portion (as shown by dotted lines in Figure 4), the disk being provided with a corresponding squared hole, so that such disk cannot rock. Such squared portion of the pin is located at a location of the pin other than the rounded portion of the pin. Such squared portion of the pin is smaller than the rounded portion of the pin, which rounded portion of the pin constitutes the support on which the hub portion of the arm 17 is journalled. This relation of size of the squared portion to the round portion of the pin is well shown in Figure 4. Or, in other cases when it is desired that one or both of the disks shall not rock, such assurance can be obtained by cementing such disk to the proximate surface of the bracket element 14 or 15. In either of such schemes the disk will be held stationary and assurance will be had that the releasing rock must occur between the surfaces of the hub portion of the arm, and the proximate disk surface or surfaces. In other cases it may be found desirable to cement or otherwise adhere a disk or both disks to the hub portion of the arm, thus ensuring that rock of the arm will be accompanied by corresponding rock of such disk, and with need of frictional rocking movement of such disk or disks on the proximate surface of the bracket 14 or 15 or both such brackets. Thus, I do not limit myself except as I may limit myself in the claims to the exact manner of support of the disks as long as they are free to produce the desired frictional action with respect to either the hub portion of the arm or the proximate bracket element, or both.

Figure 1:
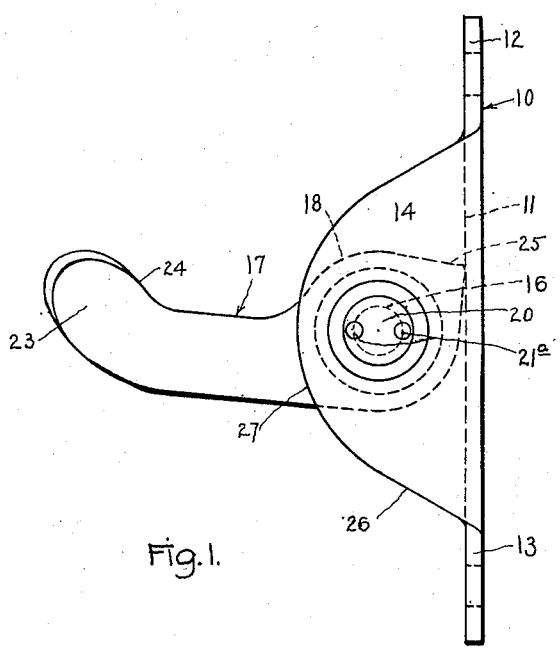
Figure 1 shows a side elevational view of a typical form of my improved releasable hook unit, with the arm extending outwardly in substantially horizontal fashion for the normal or intended use of the unit.
Figure 2:
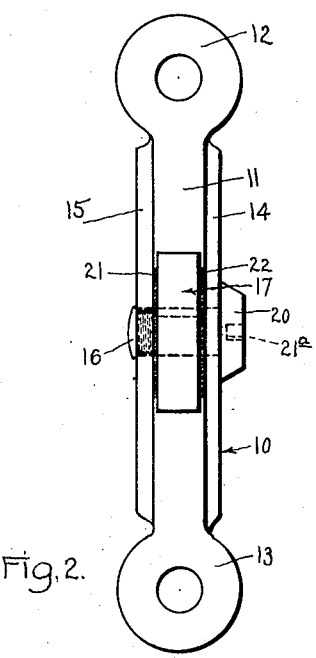
Figure 2 shows a front elevational view corresponding to Figure 1, looking towards the left-hand side of the unit shown in Figure 1.

The adjustment of the tension exerted by the pin 16 tending to flex the bracket elements towards each other may be produced by use of a spanner wrench having studs to engage the sockets 21 provided in the end face of the pin head 20 as shown in Figures 1, 2 and 3.

Preferably the hub portion of the arm is provided with a teat or lug 25 which will engage against the face of the bracket plate 11 to limit the up rock of the arm during the original setting of the device, to ensure that the arm will extend in substantial horizontal direction as shown in Figure 1. During down rock of such arm under imposition of excess load this lug will move forwardly away from the surface of the bracket plate.

Preferably, also, the rock arm is formed with a slight upwardly extending end portion 23 to assist in holding clothing and other elements on the arm in normal manner. However, it is noted that the formation of such arm portion is such that as the arm descends under imposition of an excess load (such as the cord or other tension element which the person attempting suicide might use during his attempt) such cord or other tension element will slide off from the arm, thus defeating such suicide attempt. This objective is attained by forming the inner surface 24 of such end enlargement 23 on an angle of substantially not over 45 degrees to the general axis of the arm measured lengthwise thereof.

Examination of Figure 1 in particular will show that the bracket arms are of such configuration that at no point of down rock of the arm 17 would it be possible to insert an interfering object horizontally beneath the arm and resting against the brackets 14 and 15 to stop the down rock of the arm prior to attainment of such a down slant of the arm as would discharge the tension element sustained thereby. This result is secured by reason of the steepness of the lower edges 26 of the brackets. Any interfering object placed across the said edges just beneath the arm (when in its horizontal or normal position, or any other down-slanting position) would fail to catch on such bracket edges 26 and would be driven down as the arm descended, thus preventing any interference with the intended operation of the device. In this connection it is pointed out that such edges are formed at an angle of substantially 60 degrees to the vertical, and connect at their outer ends with the circular arc portion 27 of the brackets.

The teat or lug 25 already referred to performs an important function in that it prevents raising of the arm to an elevation above substantial horizontality. Without such lug it would be possible to raise the arm high enough to produce an upwardly facing socket or V-shaped recess into which the tension element intended to sustain the suicide attempting person might be located, and under these conditions the friction developed by the friction disks against the hub of the arm might be great enough to restrain rock of such arm by the weight of the person attempting suicide. This fact will be understood when it is realized that the torque arm tending to produce such rock of the arm would be much shorter under such assumed conditions than when the arm was retained against up rock from its horizontal position, illustrated in Figure 1. Furthermore, the upwardly facing or top edges of the brackets are formed on a slant of substantially forty-five degrees to the horizontal, as shown in Figure 1. Therefore, any attempt to suspend the cord or other tension element on such upwardly facing edges would be defeated since such cord or tension element would slide down and refuse to be sustained by such slanting edges.

I claim:

1. As a new article of manufacture, a relievable hanger, comprising a bracket element including a base plate for attachment to a vertical structural element and including a pair of forwardly projecting parallel bracket flanges, a journal pin extending between said bracket flanges, an article supporting arm including a hub portion journalled on the pin between the bracket flanges, means in connection with said arm to engage the front surface of the base plate to limit upswing of the arm at a position substantially at right angles to the base plate and means in connection with the journal pin to flex the bracket flanges towards each other to create a frictional pressure against the hub portion of the arm, said flange flexing means being preadjustable to vary the amount of said friction pressure, the top edges of the bracket flanges being formed at an angle of not less than substantially forty-five degrees to the base plate, and an upstanding lug on the end portion of the supporting arm, said lug slanting down to meet the top surface of the supporting arm at an angle of not more than substantially forty-five degrees to the top surface of the supporting arm, the lower surface of the supporting arm and the lower portions of the bracket flanges being constituted to allow down swing of the supporting arm into substantial parallelism with the base plate.

2. A relievable hanger as defined in claim 1, together with means to lock the bracket flange flexing means in adjusted position to also lock the amount of friction pressure at adjusted value.

3. A relievable hanger as defined in claim 1, wherein the means to flex the bracket flanges towards each other comprises threading between the pin and at least one of the bracket flanges, together with a head element on the pin in engagement with the other element.

4. A relievable hanger as defined in claim 1, together with friction washers between the sides of the hub portion of the arm and the proximate faces of the bracket flanges.

5. A relievable hanger as defined in claim 1, wherein the inside faces of the bracket flanges and the proximate faces of the hub portion of the arm are smooth flat surfaces.

6. A relievable hanger as defined in claim 5, together with friction washers between the bracket flange faces and the proximate faces of the hub portion of the arm.

7. A relievable hanger as defined in claim 6, wherein said washers comprise material having substantially the friction qualities of hard red fiber.

References Cited in the file of this patent

UNITED STATES PATENTS

| | | |
|---|---|---|
| 1,264,837 | Moen | Apr. 30, 1918 |
| 1,897,400 | Scofield | Feb. 13, 1933 |
| 2,277,332 | Lamb | Mar. 24, 1942 |
| 2,561,225 | Powell | July 17, 1951 |
| 2,642,244 | Beach | June 16, 1953 |
| 2,673,059 | Lustig | Mar. 23, 1954 |

FOREIGN PATENTS

| | | |
|---|---|---|
| 461,005 | Great Britain | Feb. 5, 1937 |